United States Patent
Astle et al.

(10) Patent No.: US 8,473,321 B2
(45) Date of Patent: Jun. 25, 2013

(54) METHOD AND APPARATUS FOR ASSOCIATING PRIVILEGES WITH PEOPLE IN AN ORGANIZATION

(75) Inventors: Robert L. Astle, Sherman, TX (US); Robert W. Miller, Denison, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2849 days.

(21) Appl. No.: 10/256,227

(22) Filed: Sep. 25, 2002

(65) Prior Publication Data

US 2004/0059587 A1   Mar. 25, 2004

(51) Int. Cl.
*G06Q 10/00* (2012.01)

(52) U.S. Cl.
USPC ........................................ 705/7.17; 705/7.23

(58) Field of Classification Search
USPC .................. 705/7, 9, 18, 7.17, 7.23
See application file for complete search history.

(56) References Cited

U.S. PATENT DOCUMENTS

| | | | |
|---|---|---|---|
| 6,442,696 B1 * | 8/2002 | Wray et al. | 726/5 |
| 6,766,165 B2 * | 7/2004 | Sharma et al. | 455/423 |
| 6,944,279 B2 * | 9/2005 | Elsey et al. | 379/218.01 |
| 7,013,284 B2 * | 3/2006 | Guyan et al. | 705/9 |
| 7,185,010 B2 * | 2/2007 | Morinville | 707/6 |
| 2002/0002677 A1 * | 1/2002 | Eade et al. | 713/164 |
| 2002/0007300 A1 * | 1/2002 | Slatter | 705/9 |
| 2002/0156782 A1 * | 10/2002 | Rubert | 707/9 |
| 2003/0014300 A1 * | 1/2003 | Franco et al. | 705/10 |
| 2003/0079136 A1 * | 4/2003 | Ericta et al. | 713/185 |

OTHER PUBLICATIONS

Osborn et al, "Modeling Users in Role-Based Access Control", Proceedings of the fifth ACM workshop on Role-based access control, Berlin, Germany, 2000.*

Kuhn, "Mutual Exclusion of Roles aas a Means of Implementing Separation of Duty in Role-based Access Control Systems", Proceedings of the second ACM workshop on Role-based access control, Fairfax, Virginia, 1997.*

Tari et al, "A Role-based Access Control for Intranet Security", IEEE Internet Computing, 1089-7801/97, 1997.*

W. A. Jansen, "A Revised Model for Role-Based Access Control", NISTIR 6192, National Institute of Standards and Technology (NIST), Gaithersburg, Maryland, Jul. 9, 1998, Cover page, Table of Contents and pp. 1-20.

* cited by examiner

*Primary Examiner* — Thomas Mansfield

(57) ABSTRACT

A technique for associating privileges to people within an organization involves: maintaining for each of a plurality of objects an identification of an owner; maintaining for each of the objects an identification of at least one privilege associated therewith; and defining a role associated with a selected owner, the role identifying a privilege set containing at least one of the privileges, and the role having a criteria that defines which of a plurality of subjects are eligible to enjoy the privilege set, each privilege in the privilege set being associated with one of the objects associated with the selected owner.

24 Claims, 8 Drawing Sheets

METHOD AND APPARATUS FOR ASSOCIATING PRIVILEGES WITH PEOPLE IN AN ORGANIZATION

TECHNICAL FIELD OF THE INVENTION

This invention relates in general to the administration of privileges within an organization and, more particularly, to the association of privileges to people within an organization.

BACKGROUND OF THE INVENTION

In an organization such as a business enterprise, there are various different privileges which can be associated with various different employees. For example, virtually all of the employees will be assigned the privilege of physical access to the building in which they work. On the other hand, there are privileges which will be available to some employees but not others. For example, employees who deal with financial aspects of the organization will typically be granted the privilege of access to the financial software used by the organization, whereas other employees will not have access to this software. Consequently, organizations face the issue of how to associate a variety of different privileges to a variety of different employees in an efficient and accurate manner.

A common traditional approach is to attempt to define a hierarchical model of the enterprise, primarily in terms in location, job function and/or organizational information. As a simple hypothetical example, a traditional enterprise may have an East facility, a Central facility and a West facility. Each of these three physical facilities may have a respective section of the overall sales department, a respective section of the overall production department, and respective section of the overall finance department. Each such section of each department may have a subset of employees who are identified as the clerical group of that department. Thus, there would be nine separate and distinct clerical groups, including the East sales clerical group, the East production clerical group, the East finance clerical group, the Central sales clerical group, the Central production clerical group, the Central finance clerical group, the West sales clerical group, the West production clerical group, and the West finance clerical group.

If management decided that all of the clerical employees in the organization were entitled to enjoy some new privilege, then a complex and manually intensive procedure is followed in order to associate the new privilege with each of the nine different groups of clerical employees. Of course, this hypothetical example is much simpler than would be the case in a typical large corporation, especially where the employees who are to receive the new privilege fall into a number of different categories, rather than just a single category such as "clerical". The situation is even more problematic where the established hierarchy does not include a block or node corresponding to the particular group of employees to whom the new privilege is to be associated. In that case, it may be necessary to associate the privilege to some or all of those employees on an employee-by-employee basis, which is extremely cumbersome and prone to errors.

The traditional approach to administration of privileges is thus based on a model that does not accurately represent the enterprise in question, and that results in inefficient administrative and/or data management. The traditional approach is practical only for small businesses, or for businesses that assign privileges only on a high-level basis, or otherwise abstract the data structure describing the business. A further consideration is that the traditional approach typically grants several privileges to a specified group of employees, without regard to the fact there are different persons who are responsible for making the decisions regarding which employees will be allowed to enjoy the respective different privileges. A by-product of the traditional approach is that, due to abstraction of business structures in an attempt to administer a complex hierarchy, tradeoffs are commonly made that often lead to weaker security.

SUMMARY OF THE INVENTION

From the foregoing, it may be appreciated that a need has arisen for a method and apparatus for facilitating efficient assignment of privileges to subjects within an organization. According to one form of the present invention, a method and apparatus are provided to address this need, and involve: maintaining for each of a plurality of objects an identification of an owner; maintaining for each of the objects an identification of at least one privilege associated therewith; and defining a role associated with a selected owner, the role identifying a privilege set containing at least one of the privileges, and the role having a criteria that defines which of a plurality of subjects are eligible to enjoy the privilege set, each privilege in the privilege set being associated with one of the objects associated with the selected owner.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

To facilitate a clear understanding of the present invention, the following explanation is presented in the context of a hypothetical company named Widget, Inc. Widget currently does business only in the United States, and is in the business of engineering, producing, marketing and distributing widgets. Widget is headquartered in Dallas, Tex., with other facilities in Houston, Tex. and Miami, Fla.

Figure 1:
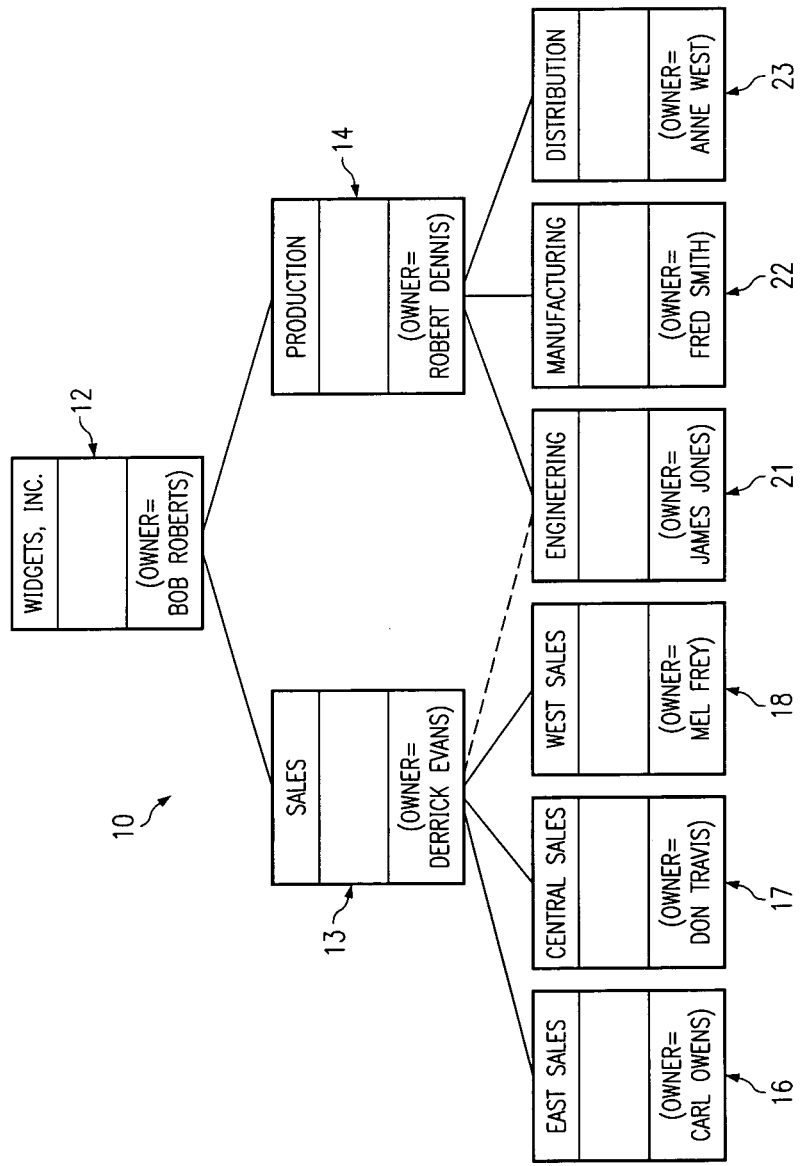
FIG. 1 is a block diagram of the organizational structure of a hypothetical organization, and is utilized to achieve aspects of the present invention.

FIG. 1 is a block diagram of the organizational structure 10 of Widget, Inc. The organization includes a parent 12, and two divisions in the form of a sales division 13 and a production division 14. The sales division 13 includes three subdivisions, which are the East sales subdivision 16, the Central sales subdivision 17, and the West sales subdivision 18. The production division 14 also includes three subdivisions, which are engineering 21, manufacturing 22, and distribution 23. The sales division 13 is also matrixed to the engineering subdivision 21 of the production division 14, as indicated by the broken line in FIG. 1. The divisions 13-14 and subdivisions 16-18 and 21-23 are not separate corporate entities, but instead represent organizational departments which are all portions of the parent company 12. However, it would alternatively be possible for one or more of the divisions 13-14 and/or subdivisions 16-18 and 21-23 to be separate corporations, without affecting the manner in which the present invention would be utilized by Widget, nc.

For purposes of the following discussion, the word "owner" is not used to refer to the person or persons (such as stockholders) who have legal title to something. Instead, and as will become clear from the ensuing discussion, the word "owner" is used to refer to a person who has the power or control to make certain decisions regarding a given tangible or intangible "object". An "object" is an entity such as a division, subdivision resource, data file, record, program, or person, which may contain information or processes. One example of a specific type of object is a "subject", such as a person, application, or network. A subject is an object that becomes active and acts on one or more objects, for example by causing information to flow among objects, by altering an object, or by changing the state of an object. Another example of a specific type of object is a "technical object", which is an entity of a technical nature that may be secured logically and sometimes physically, such as instances of networks, systems, applications (processes and data), and devices. Technical objects can sometimes be subjects.

Each of the blocks in FIG. 1 is considered to be an object, and has an "owner". In the case of Widget, each of the organizational blocks in FIG. 1 has a manager who is a respective employee of the company. Widget has decided that the manager of each organizational block will be the "owner" of that block or object. The name of the manager or owner of each block in FIG. 1 is set forth at the bottom of the block. TABLE 1 sets forth in tabular form the same organizational information which is expressed diagrammatically in FIG. 1.

Figure 2A:
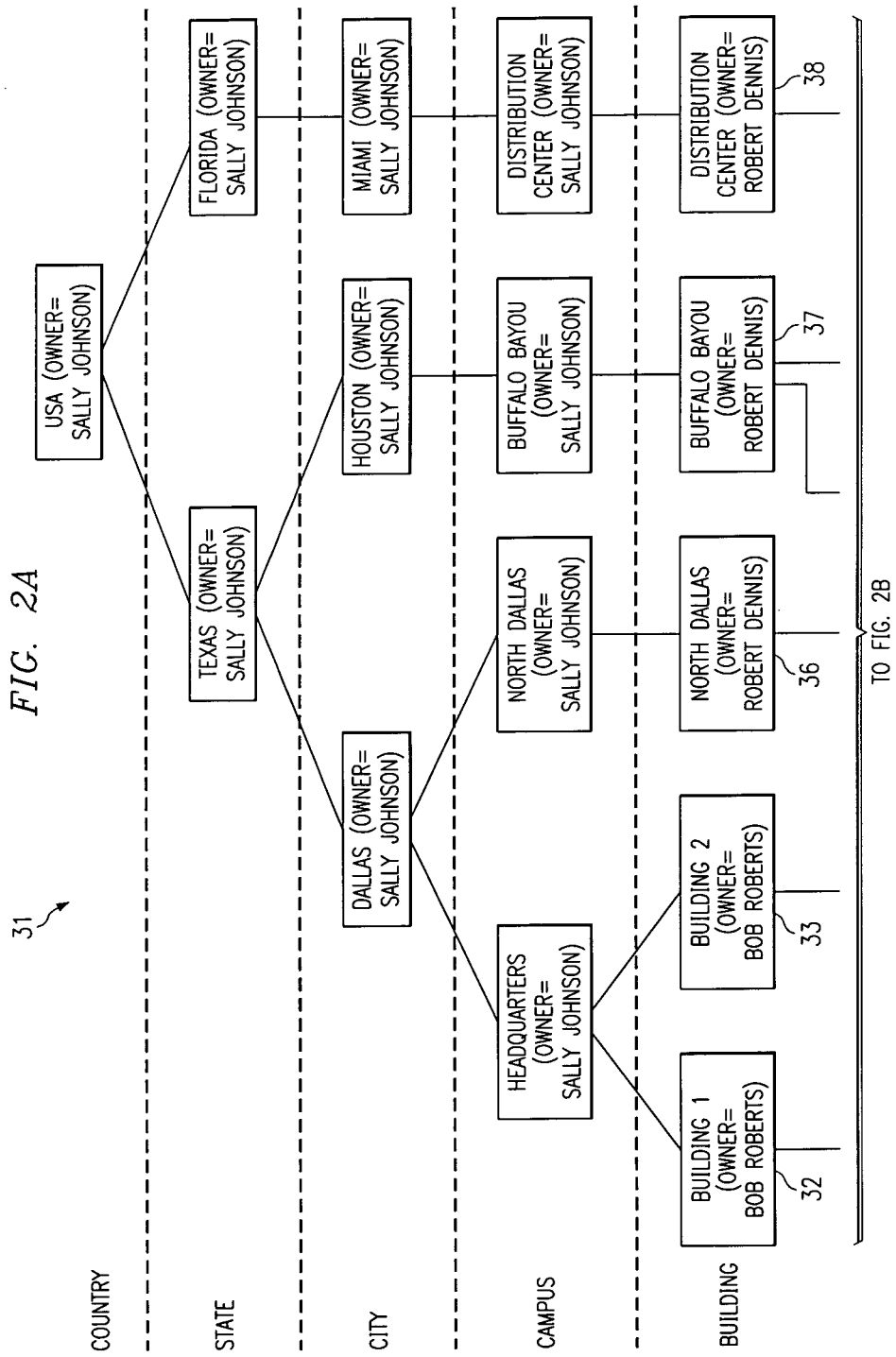
FIG. 2 is a block diagram of a location hierarchy for the hypothetical organization of FIG. 1, and is utilized to achieve aspects of the present invention.
Figure 2B:
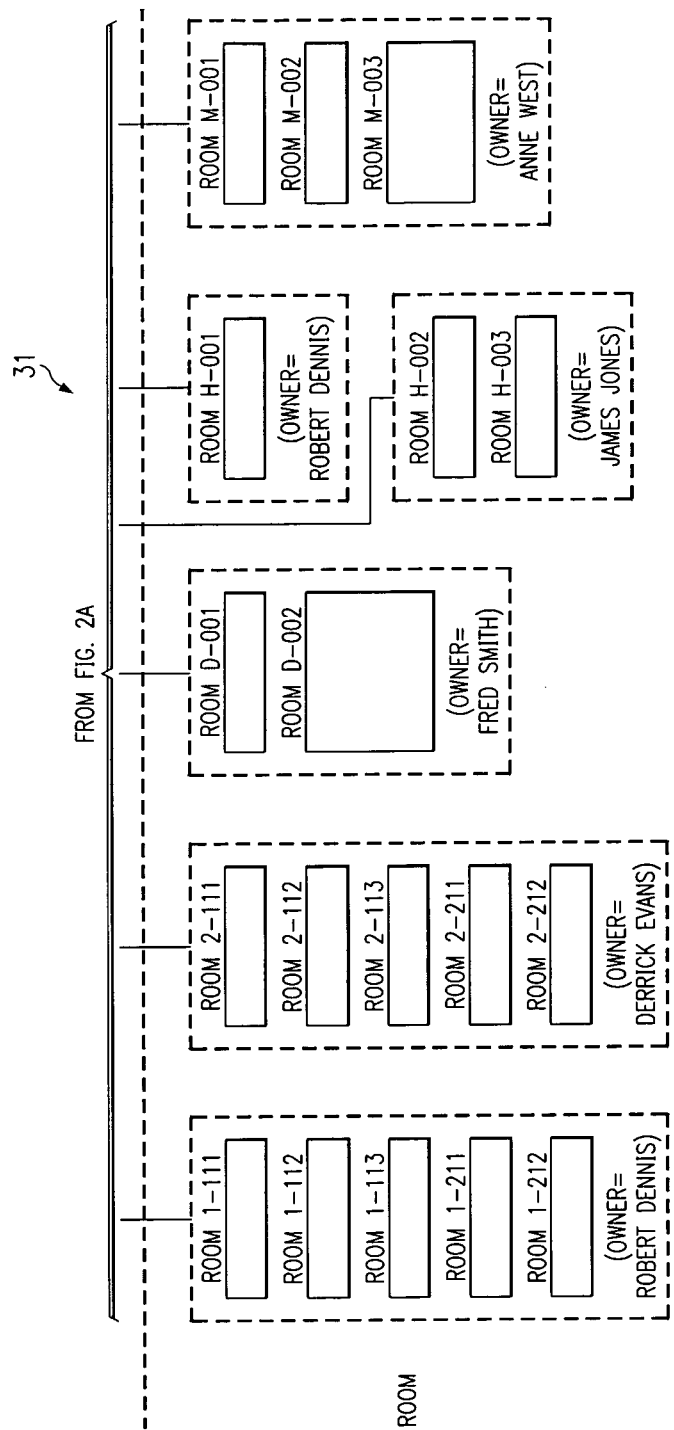

FIG. 2 is a block diagram showing a hierarchy of location information regarding the physical facilities used by Widget. In this regard, Widget uses five buildings disposed in four different locations. In particular, Widget has a Headquarters campus in Dallas, Texas, which includes two building 32 and 33, each of which has five rooms. Several miles north of this campus, Widget has a North Dallas campus, with a single building 36 that has two rooms. In Houston, Tex., Widget has a Buffalo Bayou campus with a single building 37 that has three rooms. In Miami, Fla., Widget has a Distribution Center campus with a single building 38 that has three rooms. TABLE 2 sets forth in tabular form the same location information which is shown diagrammatically in FIG. 2.

Each block in FIG. 2 is an "object" of the type discussed above, and has a designated employee who serves as its "owner". That is, each room has an owner, each building has an owner, each campus has an owner, each city has an owner, each state has an owner, and each country has an owner. FIG. 2 sets forth the names of the various Widget employees who serve as these owners.

The Widget company has four types of job positions or job codes, which are (1) manager, (2) engineer, (3) clerk and (4) labor (physical labor). TABLE 3 sets forth these positions or job codes in tabular form. Each such job code is an "object", and each is associated with a designated employee who serves its "owner".

The Widget company has 19 employees, all of whom are listed in TABLE 4. Each of these employees is a "subject" of the type discussed above. Each employee or subject is thus an object, and has an "owner", where the "owner" for each employee is a person who is a supervisory manager as to that employee. The second column of TABLE 4 identifies the owner of each employee. The third column identifies the organizational block in FIG. 1 to which each employee is assigned. The fourth column in TABLE 4 identifies the job code assigned to each employee. The fifth column in TABLE 4 identifies the particular room in the location hierarchy (FIG. 2) to which each employee is assigned.

A few comments regarding TABLE 4 will be helpful. First, it will be noted that Bob Roberts is identified as his own owner or manager. This is because he is the president of Widget, and thus the most senior employee, who is not supervised by any other employee. In addition, it will be noted that Trudy Black is assigned to two different portions of the organization and two different rooms. Her primary responsibility is with the distribution organization, but she has frequent temporary assignments to manufacturing, when demand is high. Further, it will also be noted that Sidney Fowler is an engineer who is not assigned to any particular room in the location hierarchy. This is because he is a sales and support engineer who travels for Widget on a full-time basis, and thus has no assigned location.

Figure 3:
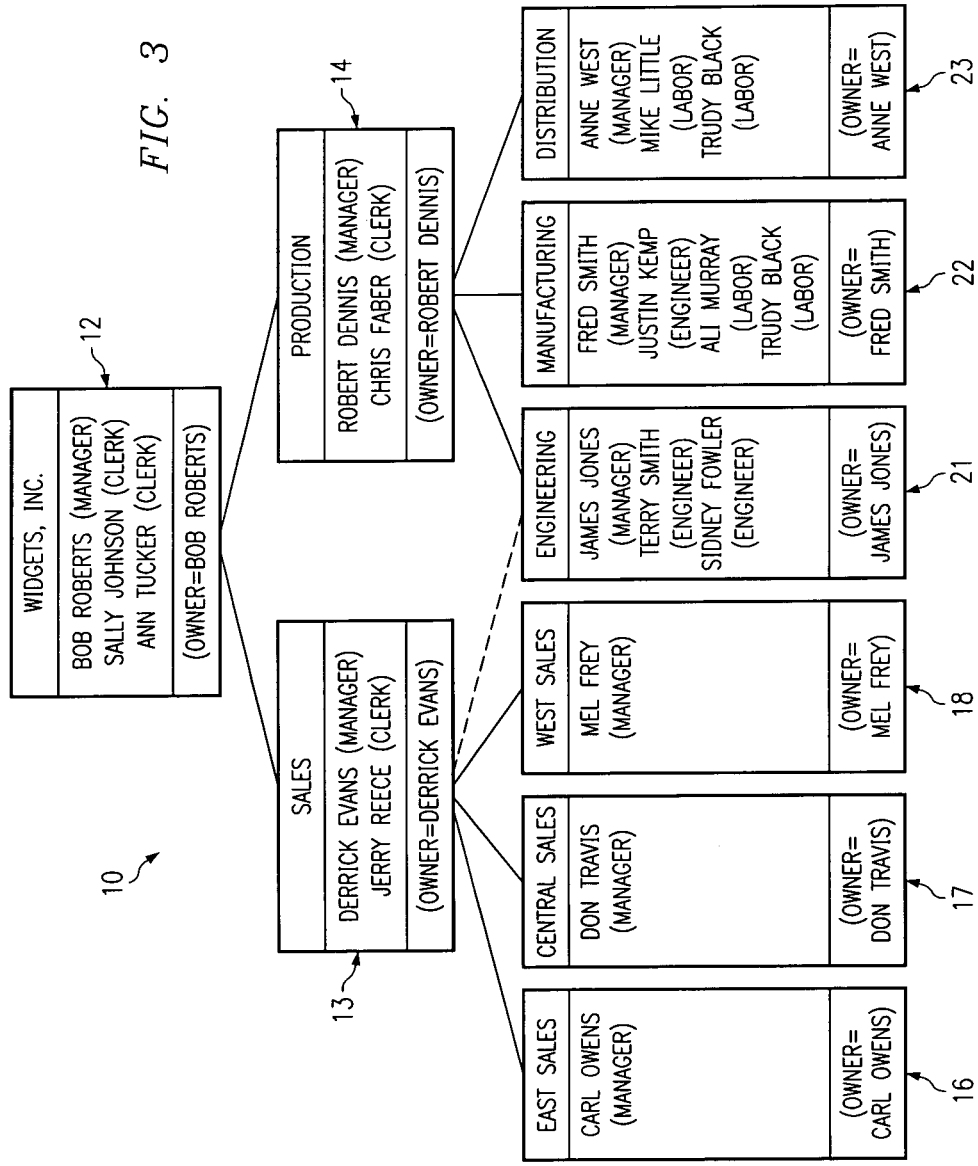
FIG. 3 is a block diagram similar to FIG. 1, but with the addition of information about employees of the hypothetical organization.
Figure 4A:
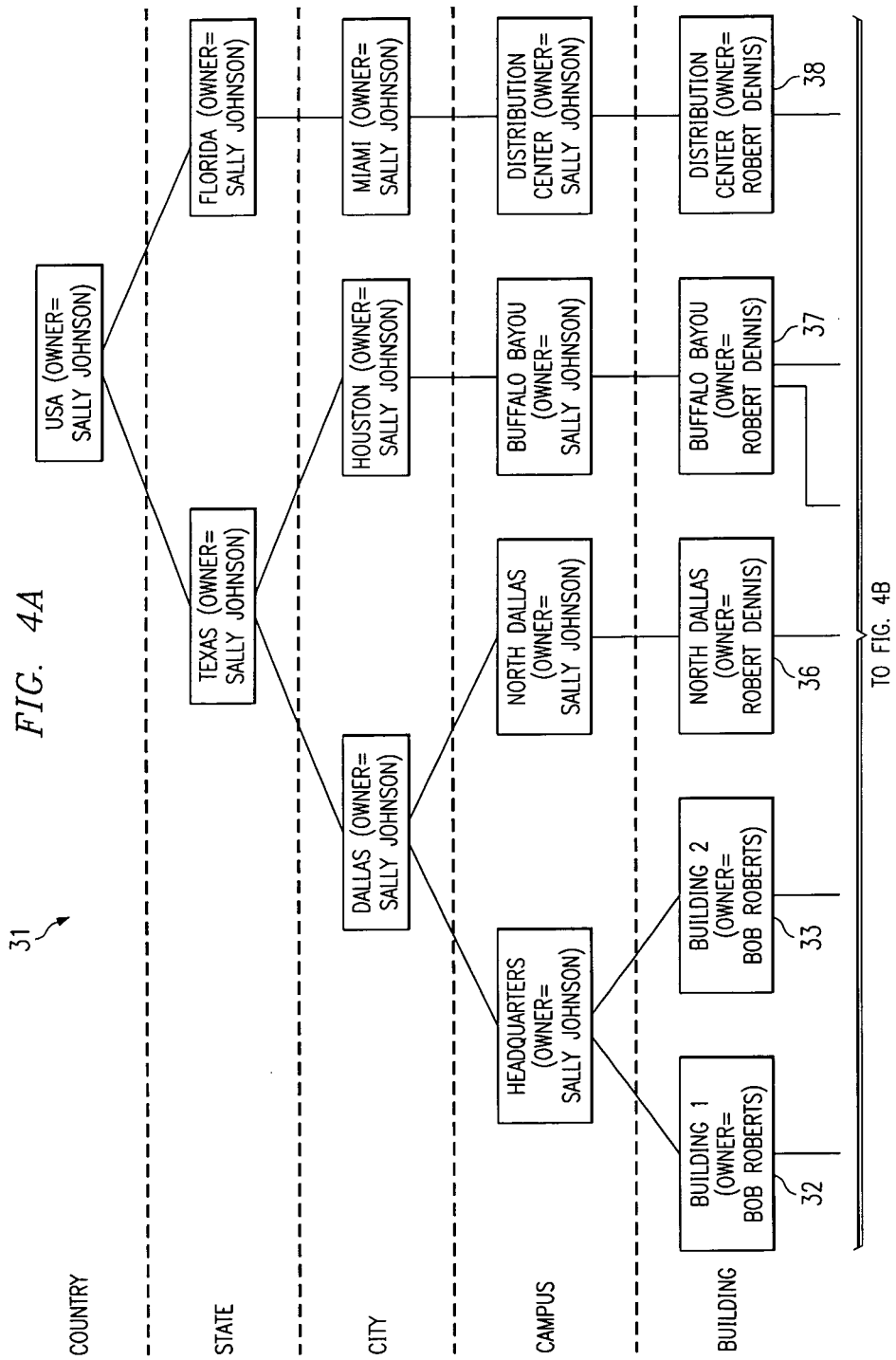
FIG. 4 is a block diagram similar to FIG. 2, but with the addition of information about employees of the hypothetical organization.
Figure 4B:
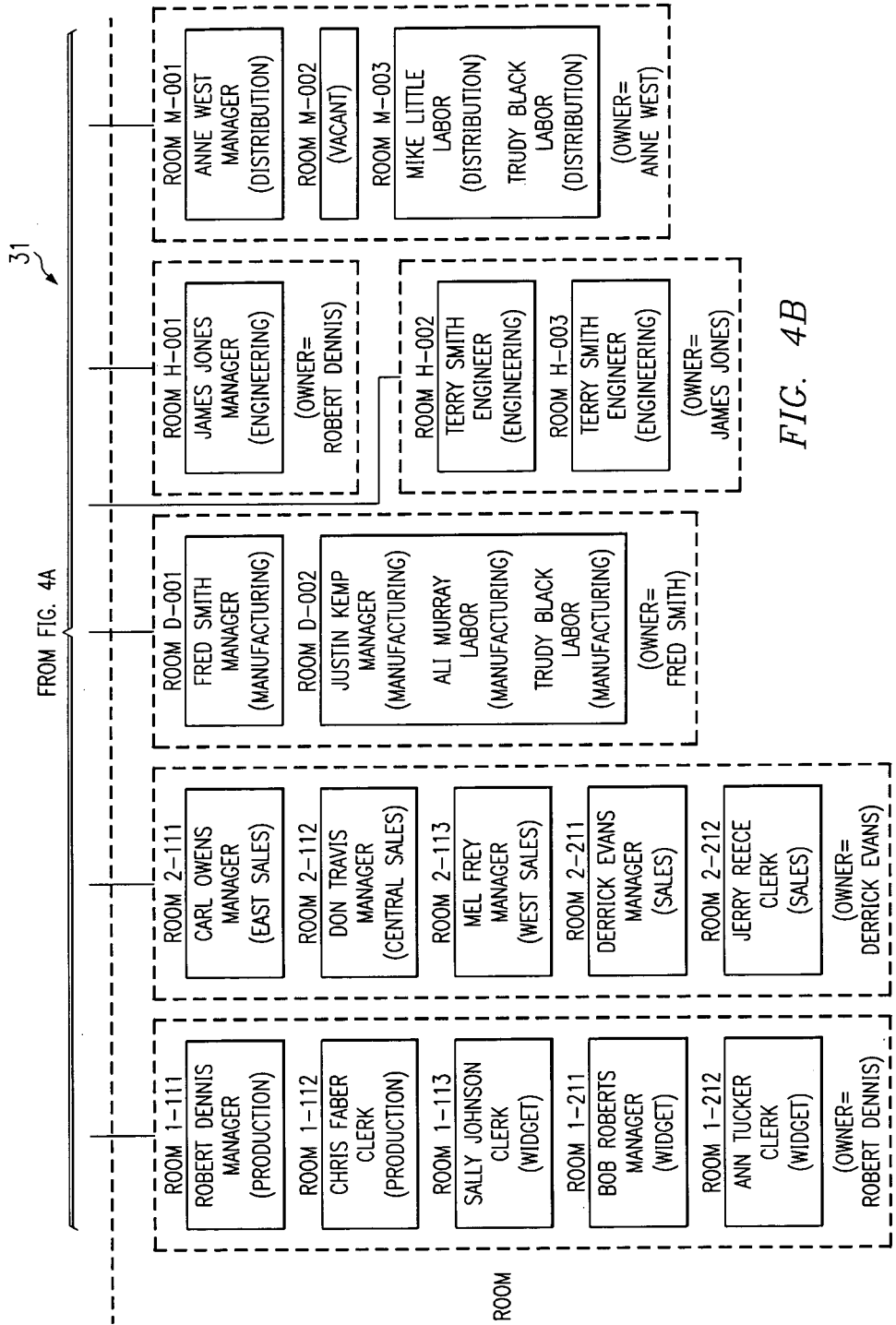

FIG. 3 is a block diagram similar to FIG. 1, but has the names of all employees and their job position added in the respective organizational block to which they are assigned. FIG. 4 is a block diagram similar to FIG. 2, but has the names of employees added in the blocks representing rooms, along with an indication of the job code for each employee, and an indication of the organizational section to which each employee is assigned. It will be noted that FIG. 4 includes the names of all employees except Sidney Fowler. As explained above, Sidney Fowler is not assigned to any room, and his name thus does not appear in FIG. 4.

It will be noted that, in the case of the Widget company, there is a degree of correlation between the organizational hierarchy of FIG. 1 and the location hierarchy of FIG. 2. For example, the North Dallas campus is dedicated to the manufacturing subdivision, the Buffalo Boyou campus in Houston is dedicated to the engineering subdivision, and the Distribution Center campus in Miami is dedicated to the distribution subdivision. However, it would alternatively be possible for the organizational hierarchy have very little correlation to the location hierarchy. For example, manufacturing, engineering and distribution could each have several groups of employees respectively working in various different locations. This is why the organization hierarchy of FIG. 1 and the location hierarchy of FIG. 2 are treated as separate and independent hierarchies for purposes of the present invention.

Figure 5:
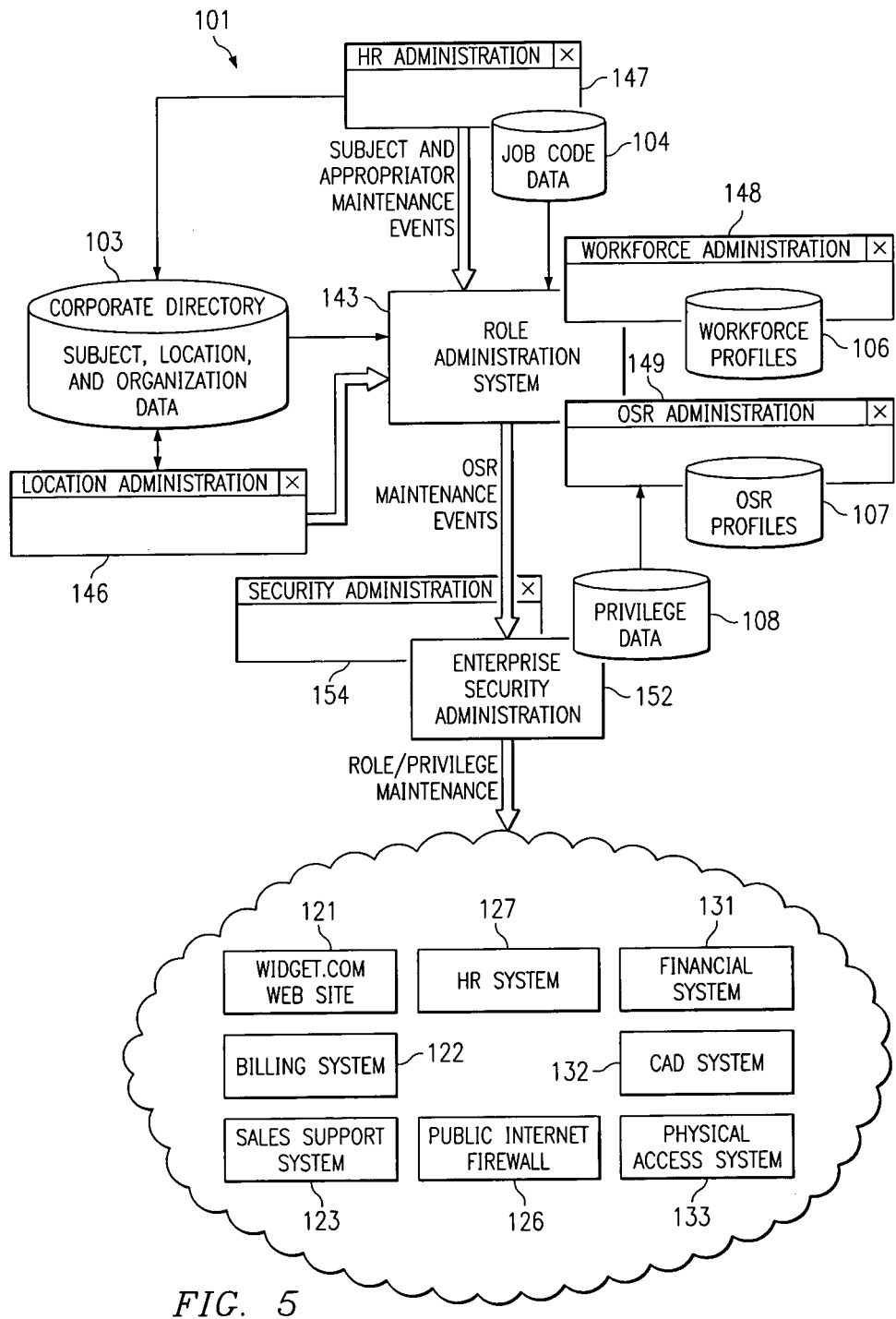
FIG. 5 is a block diagram of selected portions of the hardware and software of a computer system which is used by the hypothetical organization and which implements aspects of the present invention.

FIG. 5 is a block diagram of various hardware and software aspects of a computer system 101 utilized by Widget. The computer system 101 includes a corporate directory 103 that contains the subject data of TABLE 4, the location data of TABLE 2 and FIG. 2, and the organizational data of TABLE 1 and FIG. 1. The job code data of TABLE 3 is stored at 104. Workforce profiles are stored at 106, and will be explained in more detail later. Owner-scoped roles (OSRs) are stored at 107, and will also be explained in more detail later. Privilege information is stored at 108, and will be explained later.

The system 101 includes various types of standard software systems used by Widget, including an Internet Web site 121, a billing program 122, a sales and support program 123, a public Internet firewall 126, and a human resources (HR) system 127. In addition, there is a financial system 131, a computer aided drafting (CAD) system 132, and a physical access system 133 which is used to administer the extent to which employees have physical access to the five buildings 32-38 (FIG. 2) used by Widget.

The computer system 101 further includes a role administration system 143 which is used, among other things, to administer the role profiles stored at 107. The role administration system 143 has several user interfaces, including an interface 146 used to administer the location and organization data stored at 103, and an interface 147 used to administer HR information such as the HR system 127 and the subject data stored at 103. A further interface 148 is used to administer the workforce profiles stored at 106, and an interface 149 is used to administer the role profiles stored at 107. The computer system 101 further includes an enterprise security administration system 152 with a user interface 154, one capability of which is administration of the privilege information stored at 108.

TABLE 5 presents a selected portion of the privilege information stored at 108. A privilege involves a degree of permission or authorization to interact with a specified object. In this regard, the various software systems shown in the lower portion of FIG. 5 are forms of objects that each have an owner, and TABLE 5 lists several of these objects and the associated employee who serves as the owner. Each of these software systems is configured to allow various different levels of access. For example, with respect to CAD files in the CAD system 132 that relate to a given project, some persons may be provided with "read" access so they can view the files but not alter them, whereas other persons will be provided with "write" access so they can both view and alter the files. These different levels of access represent different levels of privilege.

With reference to FIG. 2, a different type of object listed in TABLE 5 is each campus of Widget, including the Headquarters campus, the North Dallas campus, the Houston Buffalo Bayou campus, and the Miami Distribution Center campus. The capability of an employee of Widget to enter a building at any given campus represents a privilege to have physical access to that building. Thus, as indicated in TABLE 5, a physical access privilege is associated with each campus. The privileges listed in TABLE 5 do not constitute all of the privileges that exist for Widget company, but only a representative sample.

One of the features of the present invention is the manner in which privileges, such as those listed in TABLE 5, are granted or revoked as to subjects such as the employees of Widget. This is effected through use of the role profiles stored at 107 (FIG. 5). TABLEs 6-13 are examples of profiles for several different roles which are used by Widget. Beginning with TABLE 6, a role includes a unique identification (ID) number, which is "001". The role further includes a descriptive name, which is "Corporate Systems Manager Accounts". Each role is a type of object, and therefore has an owner. In the case of the role shown in TABLE 6, the owner is employee Sally Johnson.

Each role is associated with one or more privileges. With reference to TABLEs 5 and 6, it will be noted that the role of TABLE 6 can provide access at the "Manager Account" level to each of the HR system 127 (FIG. 5), the billing system 122, and the financial system 131. If a given role lists more than one privilege, then all of the privileges in that particular role must have the same owner, who must also be the owner of the role. Stated differently, the only person who is permitted to create a role profile is the person who is the owner of each object targeted by a privilege identified in that role profile, and the person who creates the role profile becomes its owner. This is why the roles disclosed herein are referred to as "owner-scoped" roles. As one specific example, it will be noted that Sally Johnson is the owner of the role profile shown in TABLE 6, and that each of the three privileges identified in this role profile are associated with objects (software systems) for which Sally Johnson is also the owner, as evident from TABLE 5. This ensures that the owner of a given role profile, which identifies one or more privileges, is also the owner of each object to which the privilege(s) apply, so that there is no possibility for conflict between a person who creates and maintains a role profile so as to grant or revoke privileges, and a person who is responsible for any object to which those privileges relate.

Still referring to TABLE 6, the role includes one or more role appropriators, which define the subjects (such as employees) that are to receive the benefit of the specified privileges. Appropriators do not identify subjects by name, but instead identify groups of subjects by job code, location, organization, and/or other organizational data, using simple Boolean expressions. In this regard, TABLE 14 sets forth some sample appropriators, with an explanation of the meaning of each. In the exemplary role of TABLE 6, the specified privileges will be assigned to employees who have the job code of manager, and who are below (rather than in) the sales and production divisions 13 and 14 of FIG. 1. Thus, with reference to FIG. 1, the subjects who will receive the benefit of the privileges specified in the role of TABLE 6 are Carl Owens, Don Travis, Mel Fry, James Jones, Fred Smith and Anne West.

In TABLE 6, the final item is an indication of whether the role is an "offered" type of role or a "granted" type of role. The role of TABLE 6 is indicated to be a "granted" type of role. In the case of a "granted" role, the subjects who meet the definition of the role appropriator are automatically and unconditionally assigned the specified privileges. In contrast, in the case of an "offered" role, the subjects falling within the role appropriator do not automatically and unconditionally receive the specified privileges, but instead receive the privileges only if specific managerial approval has been provided, in a manner discussed later.

TABLE 7 shows a different exemplary role, which will grant "Executive Account" level privileges within the HR system, billing system and financial system to any subjects who have a job code of "manager" and who are assigned to organizations at or above the sales or production organizations. Thus, with reference to FIG. 1, this role will result in the automatic assignment of the specified privileges to Bob Roberts, Derrick Evans and Robert Dennis.

TABLE 8 represents another exemplary role, which will offer the "User Account" privilege for the public Internet firewall to any subjects who are not assigned a job code of "labor", and who are anywhere within the Widget organization. At Widget, physical laborers are not provided with computers, and therefore need no access to the public Internet through the firewall. It will be noted that this is an "offered" type of role. Thus, subjects do not automatically receive the specified privilege, but instead receive the privilege only if they have managerial approval, which can be provided in a manner discussed later. This is because use of the public Internet may involve actual monetary expense, such as charges from an Internet Service Provider (ISP). Managers are thus given the ability to control whether or not a portion of their budgets will be used for this type of expense. In the case of the role of TABLE 9, the specified privilege is "offered" (pending managerial approval) to all employees other than those with a job code of "labor" (Ali Murray, Mike Little and Trudy Black).

FIG. 9 represents a further role which will grant to all subjects within the Widget organization the "Employee Account" privilege within the Web site, and the privileges of physical access each of the campuses. In this regard, even physical laborers are given access to employee areas of the Widget Web site, so that they can access information through the Internet from home, or from kiosks placed on plant or warehouse floors.

TABLE 10 is an example of a further role which grants the power to read but not to change various CAD files. These privileges are granted to any subject who has a job code of "engineer", but who is not in the engineering subdivision. With reference to FIG. 1, this role will result in the automatic assignment of the specified privileges to a single employee (Justin Kemp).

TABLE 11 represents a different role, which will grant the privileges of both reading and writing various CAD files to every person who has a job code of "engineer", and who is within the engineering subdivision of the Widget organization. With reference to FIG. 1, this role will result in the automatic assignment of the specified privileges to two employees (Terry Smith and Sidney Fowler).

TABLE 12 represents another role, which will grant the "Executive Account" privilege to the sales support system to any subjects who have a job code of "manager", and who are in and above the production and sales divisions. With reference to FIG. 1, this role will result in the automatic assignment of the specified privilege to Bob Roberts, Derrick Evans and Robert Dennis.

TABLE 13 represents a further role, which will grant the "Sales Manager Account" privilege within the sales support system to any subjects who are in organizations below the sales organization. With reference to FIG. 1, This role will result in the automatic assignment of the specified privilege to Carl Owens, Don Travis, Mel Frey, James Jones, Terry Smith and Sidney Fowler. Note that the three employees in engineering receive these privileges because the engineering subdivision is matrixed to the sales division, as indicated by the broken line in FIG. 1.

As discussed above in association with TABLE 6, each role can be either an "offered" type of role or a "granted" type of role. A "granted" type of role automatically assigns each of the specified privileges to all qualifying subjects. In contrast, in the case of an "offered" type of role, qualifying subjects receive the specified privileges only if they have managerial approval. In the disclosed embodiment, managerial approval can be granted through the creation of one of the workforce profiles stored at 106 in FIG. 5.

TABLE 15 is example of a workforce profile. A workforce profile is created by a manager, in order to identify a group of people (subjects) who work for that manager, and in order to identify an existing role. The workforce profile serves as an indication that the subjects who are specified in the workforce and who also meet the criteria of the role have managerial approval to enjoy the specified privilege(s) of that role.

In more detail, TABLE 15 shows that the workforce profile includes a unique identification number, which in this example is "001." The profile also has a descriptive name, which is "Eligible Public Internet Personnel". The workforce profile is a form of object, and thus has an owner, who in this case is Bob Roberts. Stated differently, Bob Roberts is the owner because he is the manager who created this workforce profile in order to provide managerial approval for a specified group of subjects within his managerial domain to enjoy certain privileges if specified conditions are met.

The workforce profile in TABLE 15 also includes an identification of the role to which it applies, which in this case is the role "003" shown in TABLE 8 and discussed above. The last item in the workforce profile is an appropriator, which has a form of the type discussed above in association with TABLE 14. The appropriator must identify only employees who are within the managerial domain of the owner of the workforce profile, and the role administration system 143 (FIG. 5) verifies that this condition is met before it allows the the workforce profile to actually be created. Thus, with reference to FIG. 1, James Jones manages engineering 21, and can therefore create a workforce which affects himself, Terry Smith and/or Sidney Fowler. On the other hand, he cannot create a workforce which affects any other employee of any Widget organization, because he does not manage any of those other employees.

Various events can result in changes to various types of information maintained within the computer system 101 of FIG. 5, including roles and workforces. Examples of these events include newly-hired employees, employees who depart, new or removed organizations, changes in the existing organizational structure, security policy changes, new or removed locations, new or removed job codes, new or removed privileges, and so forth. In many situations, the role administration system 143 of FIG. 5 can respond to events by automatically effecting updates which, in preexisting systems, required manually intensive analysis and data entry.

TABLE 16 is an example of an event definition which the HR administration interface 147 passes through to the role administration system 143 in response to the hiring of a new employee. The profile of TABLE 16 has a unique identification code, formed by concatenating the date, the time, and a three-digit numerical value. The next item in the profile is the name of the new employee, which in this case is "Julie Stroud". The next item in the profile identifies the type of event, which in this case is a "new hire". The final item in the profile identifies one or more types of data that are affected by this event.

In this case, the profile of FIG. 16 indicates that the new employee's job code is "engineer", that the new employee is assigned to the "engineering organization, and that the new employee is assigned to room H-002. The HR administration 147 uses the information in the profile of TABLE 16 to update the subject information stored at 103 and shown in TABLE 4. The role administration system 143 searches the role profile data stored at 107 and the workforce profile data stored at 106, in order to determine which roles are to be appropriated to the new employee, and thus which privileges are to be enjoyed by the new employee. In the context of the present hypothetical, the roles appropriated to Julie Stroud will be those shown in TABLEs 8, 9, 11 and 13. Thus, the administration 143 will automatically ensure that new employee Julie Stroud starts work with access to all of the privileges granted by these roles, so that all privileges needed to do her job are immediately available to her on her first day, without any need for extensive manual updating on a piecemeal basis over several days or weeks.

TABLE 17 shows another example of an event profile, resulting from a decision by Anne West to resign and take a different position with another company. In response to this event, the HR administration 147 will automatically update the subject data stored at 103. The role administration system 143 will disassociate from Anne West all of the privileges which she previously enjoyed pursuant to the roles discussed above in association with TABLEs 6, 8 and 9.

Due to Anne West's departure, Robert Dennis decides to promote Michael Little into the position that had previously been held by Anne West. As a result, the HR administration interface 147 generates the event profile shown in TABLE 18, and automatically updates the subject data stored at 103. The role administration system 143 automatically evaluates the workforce and role profiles, in order to disassociate from Mike Little any privileges that he is no longer entitled to enjoy, and in order to associate to Mike Little any new privileges that he has now become entitled to enjoy.

As discussed above, role profiles such as those shown in FIGS. 6-13 are each an object. Therefore, it is possible to define a privilege relating to a role profile, which is the privilege of "ownership" of that role profile. In that case, when Mike Little is promoted to replace Anne West, the ownership privileges previously held by Anne West could be automatically passed to Mike Little by the role administration system 143.

Figure 6:
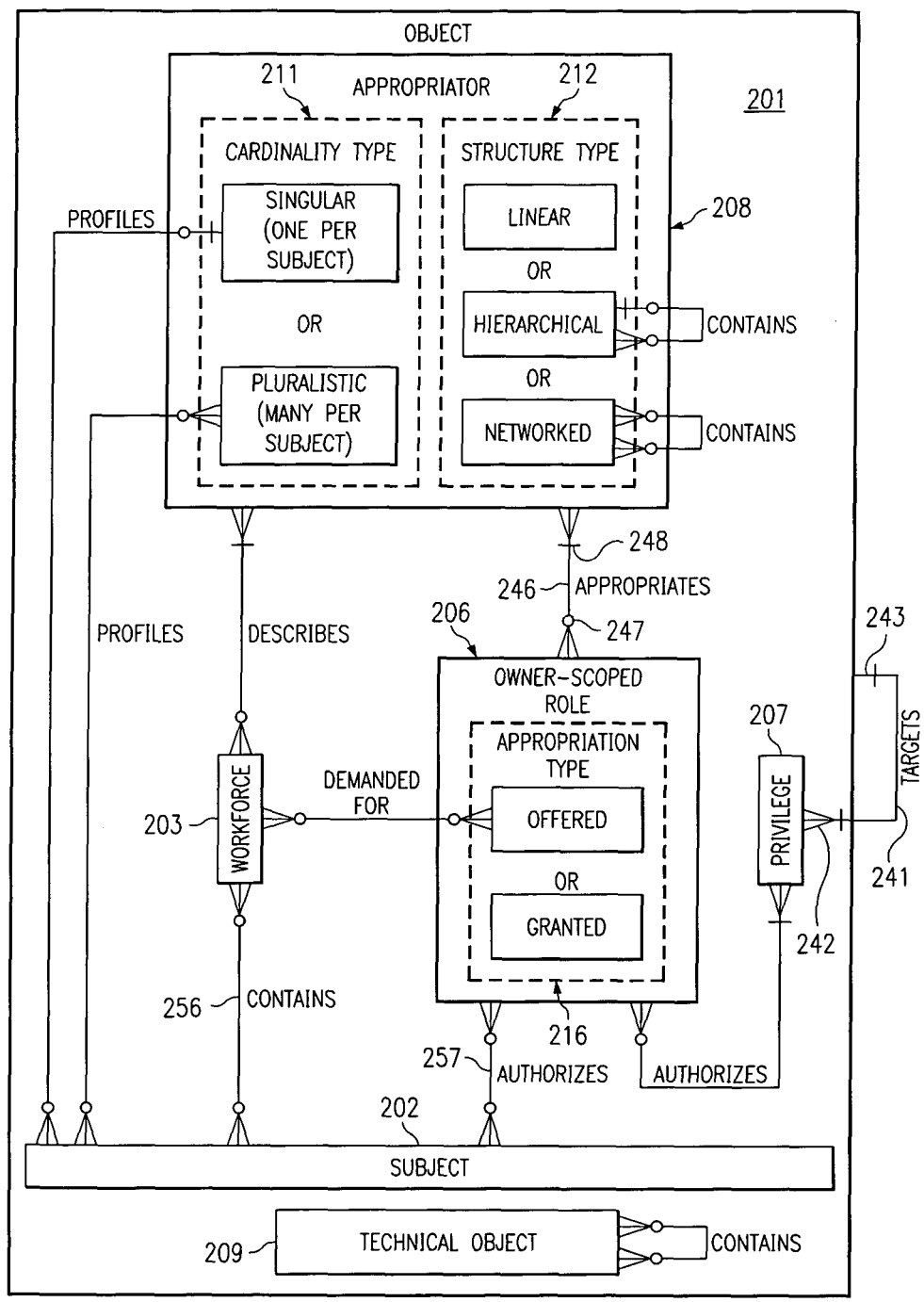
FIG. 6 is an entity relationship diagram which provides a generalized view of various types of objects and the relationships between them, including types of objects and relationships which embody aspects of the present invention.

The foregoing discussion has been presented in the specific context of the hypothetical company called Widget, Inc., which is a relatively small and simple company. However, the principles of the invention also apply to and work well within much more complex organizations. In this regard, the framework underlying the invention can be presented in a more generalized form. In particular, FIG. 6 is an interrelationship diagram, where each of the major blocks represents one or more instances of a particular type of item. In this regard, reference numeral 201 designates the set of all objects. Specific types of objects include subjects 202, workforces 203, roles 206, privileges 207, appropriators 208, and technical objects 209.

With respect to appropriators 208, each appropriator has a cardinality type 211, which is either singular or pluralistic. Each subject may be associated with only one appropriator of the singular cardinality type, but may be associated with one or more appropriators of the pluralistic cardinality type. In addition, each appropriator 208 has a structure type 212, which can either be linear, hierarchical, or network. Appropriators of the linear type are not related to each other. Appropriators of the hierarchical type may have only one parent of the same type, but may have one or more children of the same type. Appropriators of the network type may have one or more parents of the same type, and/or one or more children of the same type. Each role 206 has an appropriation type 216 which, as discussed above, is either "offered" or "granted".

In FIG. 6, the relationships between objects are represented by lines which have symbols at each end to indicate required or permissive characteristics of the relationship. For example, one end of the line 241 has multiple lines in the form of a "crow's foot" 242 in order to indicate that a given object 201 can be associated with multiple privileges 207. At its opposite end, the line 241 ends in a single line 243, to indicate that a given privilege 207 can only be associated with a single object 201. Turning to the relationship line 246, the circle 247 near one end is an indication that an identification of one or more roles 206 is optional, whereas the crossbar 248 with no circle near the opposite end is an indication that at least one appropriator 208 must be identified. The relationship lines in FIG. 6 are created and terminated manually, except for the relationship lines 256 and 257, which are established and maintained automatically by the role administration system 143 of FIG. 5.

A given privilege technically targets only one object, but indirect or implied privileges may result if the targeted object contains one or more objects. An owner-scoped role 206 is a set of privileges with common ownership of the target objects, and with common criteria specifying which subjects should be associated with the specified privileges. The owner-scoped role 206 enables roles to be managed as sets of privileges, rather than as positions or jobs. This avoids problems associated with the fact that owners or managers of positions and jobs are often not the persons authorized to make privilege assignment decisions. Instead, it is the owners of the objects targeted by privileges who can decide which subjects will have permission to act on their objects. Since each owner-scoped role is "scoped-down" to a set of privileges that target only objects having a common owner, each owner-scoped role has a single owner with clear authority to determine who will enjoy the privileges addressed by that role. A workforce 203 is a set of subjects having common ownership (common management), and having common criteria to identify what role or roles are demanded for the specified subject.

The organizational hierarchy of FIGS. 1 and 3 is maintained in a manner conforming to the interrelationship diagram of FIG. 6, as is the location hierarchy of FIGS. 2 and 4. Further, the job code data of TABLE 3, subject data of TABLE 4, privilege data of TABLE 5, role profiles of TABLEs 6-13, and workforce profile of TABLE 15 are all maintained in a manner conforming to the interrelationship diagram of FIG. 6.

The present invention provides a number of advantages. One such advantage is that a wide variety of organizations, including large-scale business enterprises, can efficiently and automatically handle the association of people to roles in support of security, provisioning, workflow and other functions. In this regard, the owner-scoped role enables roles to be managed as sets of privileges, rather than as positions or jobs. The owners or managers of positions or jobs are usually not the persons authorized to make typical decisions regarding privilege assignments. Consequently, the owner-scoped roles permit the owner of targeted objects to decide who should have permission to act on those objects. This is because the owner-scoped role is "scoped down" to only privileges that target one or more objects owned by the same person.

A further advantage results from the provision of roles which can be offered to specified persons subject to managerial approval, and the provision of workforce definitions to provide managerial approval to selected persons in an efficient manner. The present invention can provide advantages to an organization in a variety of different areas, such as security administration and provisioning, security access controls, system/network load balancing, directory data structuring and leveragability, mail distribution, and workflow.

TABLE 1

ORGANIZATION DATA

| ORGANIZATION | MANAGER (OWNER) | PARENT ORGANIZATION (S) |
|---|---|---|
| Widget, Inc. | Bob Roberts | — |
| Sales | Derrick Evans | Widget, Inc. |
| Production | Robert Dennis | Widget, Inc. |
| East Sales | Carl Owens | Sales |
| Central Sales | Don Travis | Sales |
| West Sales | Mel Frey | Sales |
| Engineering | James Jones | Production (and matrixed to Sales) |
| Manufacturing | Fred Smith | Production |
| Distribution | Anne West | Production |

TABLE 2

LOCATION DATA

| LOCATION NAME | OWNER | PARENT | LEVEL | DESCRIPTION |
|---|---|---|---|---|
| U.S.A. | Sally Johnson | — | Country | — |
| Texas | Sally Johnson | U.S.A. | State | — |
| Florida | Sally Johnson | U.S.A. | State | — |
| Dallas | Sally Johnson | Texas | City | — |
| Houston | Sally Johnson | Texas | City | — |
| Miami | Sally Johnson | Florida | City | — |
| Headquarters | Sally Johnson | Dallas | Campus | — |
| North Dallas | Sally Johnson | Dallas | Campus | — |
| Buffalo Bayou | Sally Johnson | Houston | Campus | — |
| Distribution Center | Sally Johnson | Miami | Campus | — |
| Building 1 | Bob Roberts | Headquarters | Building | Executive & Administrative Offices |
| Building 2 | Bob Roberts | Headquarters | Building | Sales Center |
| North Dallas | Robert Dennis | North Dallas | Building | Manufacturing Center |
| Buffalo Bayou | Robert Dennis | Buffalo Bayou | Building | Engineering Center |
| Distribution Center | Robert Dennis | Distribution Center | Building | Distribution Center |
| 1-111 | Robert Dennis | Building 1 | Room | Executive Suite |
| 1-112 | Robert Dennis | Building 1 | Room | Cubicle |
| 1-113 | Robert Dennis | Building 1 | Room | Office |
| 1-211 | Robert Dennis | Building 1 | Room | Executive Suite |
| 1-212 | Robert Dennis | Building 1 | Room | Cubicle |
| 2-111 | Derrick Evans | Building 2 | Room | Office |
| 2-112 | Derrick Evans | Building 2 | Room | Office |
| 2-113 | Derrick Evans | Building 2 | Room | Office |
| 2-211 | Derrick Evans | Building 2 | Room | Executive Suite |
| 2-212 | Derrick Evans | Building 2 | Room | Cubicle |
| D-001 | Fred Smith | North Dallas | Room | Office |
| D-002 | Fred Smith | North Dallas | Room | Plant Floor |
| H-001 | Robert Dennis | Buffalo Bayou | Room | Office |
| H-002 | James Jones | Buffalo Bayou | Room | Engineering Lab |
| H-003 | James Jones | Buffalo Bayou | Room | Cubicle |
| M-001 | Anne West | Distribution Center | Room | Office |
| M-002 | Anne West | Distribution Center | Room | Cubicle |
| M-003 | Anne West | Distribution Center | Room | Warehouse Floor |

TABLE 3

JOB CODE DATA

| JOB CODE NAME | MANAGER (OWNER) |
|---|---|
| Clerk | Sally Johnson |
| Manager | Sally Johnson |
| Engineer | Sally Johnson |
| Labor | Sally Johnson |

TABLE 4

SUBJECT DATA

| SUBJECT NAME | MANAGER (OWNER) | ORGANIZATION | JOB CODE | LOCATION |
|---|---|---|---|---|
| Bob Roberts | Bob Roberts | Widget, Inc. | Manager | 1-211 |
| Sally Johnson | Bob Roberts | Widget, Inc. | Clerk | 1-113 |
| Anne Tucker | Bob Roberts | Widget, Inc. | Clerk | 1-212 |
| Derrick Evans | Bob Roberts | Sales | Manager | 2-211 |
| Jerry Reece | Dale Evans | Sales | Clerk | 2-212 |
| Robert Dennis | Bob Roberts | Production | Manager | 1-111 |
| Chris Faber | Robert Dennis | Production | Clerk | 1-112 |
| Carl Owens | Derrick Evans | East Sales | Manager | 2-111 |
| Don Travis | Derrick Evans | Central Sales | Manager | 2-112 |
| Mel Frey | Derrick Evans | West Sales | Manager | 2-113 |
| James Jones | Robert Dennis | Engineering | Manager | H-001 |
| Terry Smith | James Jones | Engineering | Engineer | H-002 |
| Fred Smith | Robert Dennis | Manufacturing | Manager | D-001 |
| Justin Kemp | Fred Smith | Manufacturing | Engineer | D-002 |
| Ali Murray | Fred Smith | Manufacturing | Labor | D-002 |
| Anne West | Robert Dennis | Distribution | Manager | M-001 |
| Mike Little | Anne West | Distribution | Labor | M-003 |
| Trudy Black | Anne West | Distribution Manufacturing | Labor | M-003 D-002 |
| Sidney Fowler | James Jones | Engineering | Engineer | — |

TABLE 5

PRIVILEGE DATA

| OBJECT NAME | MANAGER (OWNER) | PRIVILEGE OPTIONS |
|---|---|---|
| HR System | Sally Johnson | Employee Account Manager Account Executive Account Administrator Account |
| Billing System | Sally Johnson | Manager Account Executive Account Administrator Account |
| Sales Support System | Derrick Evans | Sales Manager Account Executive Account Administrator Account |

TABLE 5-continued

PRIVILEGE DATA

| OBJECT NAME | MANAGER (OWNER) | PRIVILEGE OPTIONS |
|---|---|---|
| Financial System | Sally Johnson | Manager Account |
| | | Executive Account |
| | | Administrator Account |
| CAD System | James Jones | Engineer Account |
| | | Administrator Account |
| Project X CAD Files | James Jones | Read |
| | | Write |
| Project Y CAD Files | James Jones | Read |
| | | Write |
| Project Z CAD Files | James Jones | Read |
| | | Write |
| Public Internet Firewall (Outbound) | Sally Johnson | User Account |
| | | Administrator Account |
| Web Site | Sally Johnson | Public Account |
| | | Employee Account |
| | | Administrator Account |
| Headquarters Campus | Sally Johnson | Physical Access |
| North Dallas Campus | Sally Johnson | Physical Access |
| Houston Campus | Sally Johnson | Physical Access |
| Miami Campus | Sally Johnson | Physical Access |

TABLE 6

ROLE PROFILE 001

| | |
|---|---|
| Role ID: | 001 |
| Name: | Corporate Systems Manager Accounts |
| Owner: | Sally Johnson |
| Privileges: | HR System, Manager Account |
| | Billing System, Manager Account |
| | Financial System, Manager Account |
| Role Appropriator | Job Code = Manager and (Organization < Sales or Organization < Production) |
| Offered or Granted: | Granted |

TABLE 7

ROLE PROFILE 002

| | |
|---|---|
| Role ID: | 002 |
| Name: | Corporate Systems Executive Accounts |
| Owner: | Sally Johnson |
| Privileges: | HR System, Executive Account |
| | Billing System, Executive Account |
| | Financial System, Executive Account |
| Role Appropriator: | Job Code = Manager and (Organization >= Sales or Organization >= Production) |
| Offered or Granted: | Granted |

TABLE 8

ROLE PROFILE 003

| | |
|---|---|
| Role ID: | 003 |
| Name: | Public Internet Firewall User Accounts |
| Owner: | Sally Johnson |
| Privileges: | Public Internet Firewall, User Account |
| Role Appropriator: | Job Code <> Physical Labor and Organization <= Widget, Inc. |
| Offered or Granted: | Offered |

TABLE 9

ROLE PROFILE 004

| | |
|---|---|
| Role ID: | 004 |
| Name: | Widget, Inc. Employee Privileges |
| Owner: | Sally Johnson |
| Privileges: | Widget.com Web Site, Employee Account |
| | Physical Access to Headquarters Campus |
| | Physical Access to North Dallas Campus |
| | Physical Access to Buffalo Boyou Campus |
| | Physical Access to Distribution Center Campus |
| Role Appropriator: | Organization <= Widget, Inc. |
| Offered or Granted: | Granted |

TABLE 10

ROLE PROFILE 005

| | |
|---|---|
| Role ID: | 005 |
| Name: | Read Access to Engineering Assets |
| Owner | James Jones |
| Privileges | CAD System, Engineer Account |
| | Project X CAD Files, Read |
| | Project Y CAD Files, Read |
| | Project Z CAD Files, Read |
| Role Appropriator | Job Code = Engineer and Organization <> Engineering |
| Offered or Granted | Granted |

TABLE 11

ROLE PROFILE 006

| | |
|---|---|
| Role ID: | 006 |
| Name: | Write Access to Engineering Assets |
| Owner | James Jones |
| Privileges | CAD System, Engineer Account |
| | Project X CAD Files, Write |
| | Project Y CAD Files, Write |
| | Project Z CAD Files, Write |
| Role Appropriator | Job Code = Engineer and Organization = Engineering |
| Offered or Granted | Granted |

TABLE 12

ROLE PROFILE 007

| | |
|---|---|
| Role ID: | 007 |
| Name: | Executive Access to Sales Assets |
| Owner | Derrick Evans |

TABLE 12-continued

ROLE PROFILE 007

| | |
|---|---|
| Privileges | Sales Support System, Executive Account |
| Role Appropriator | Job Code = Manager and (Organization >= Production or Organization >= Sales) |
| Offered or Granted | Granted |

TABLE 13

ROLE PROFILE 008

| | |
|---|---|
| Role ID: | 008 |
| Name: | Sales Manager Access to Sales Assets |
| Owner | Derrick Evans |
| Privileges | Sales Support System, Sales Manager Account |
| Role Appropriator | Organization < Sales |
| Offered or Granted | Granted |

TABLE 14

APPROPRIATOR LOGIC

| SAMPLE APPROPRIATORS | MEANING |
|---|---|
| Organization <= Production | Specified privilege set should be assigned to anyone in Widget's production (including engineering, manufacturing and distribution). |
| Organization = Production | Specified privilege set should be assigned only to owner/manager of Widget's production. |
| Organization > Production | Specified privilege set should be assigned to anyone in the organizational structure above production. |
| Organization <= Production and Location <= Buffalo Bayou campus | Specified privilege set should be assigned to anyone in Widget's production who is also based in the Buffalo Bayou campus. |
| Organization <= Production and Location <> Buffalo Bayou | Specified privilege set should be assigned to anyone in Widget's production who is not based in the Buffalo Bayou campus. |
| Organization <> Production or Location <> Buffalo Bayou | Specified privilege set should be assigned to anyone not in Widget's production organization or not in the Buffalo Bayou campus. |
| Location <= Buffalo Bayou and Job Code = Engineer | Specified privilege set should be assigned to anyone in Widget's Buffalo Bayou campus who is assigned the job code of "engineer". |

TABLE 15

WORKFORCE PROFILE

| | |
|---|---|
| Workforce ID: | 001 |
| Name: | Eligible Public Internet Personnel |
| Owner: | Bob Roberts |
| Role: | 003 (Public Internet Firewall User Accounts) |

TABLE 15-continued

WORKFORCE PROFILE

| | |
|---|---|
| Workplace Appropriator: | Organization <= Widget Inc. |

TABLE 16

NEW HIRE EVENT

| | |
|---|---|
| Event ID: | 08.02.2002-16:09:58-001 |
| Subject ID: | Julie Stroud |
| Event Type: | New Hire |
| Affected Profile Data: | Job Code = Engineer Organization = Engineering Location = H-002 |

TABLE 17

EMPLOYEE DEPARTURE EVENT

| | |
|---|---|
| Event ID: | 08.04.2002-08:10:36-001 |
| Subject ID: | Anne West |
| Event Type: | Departure |
| Affected Profile Data: | Job Code = Manager Organization = Distribution Location = M-001 |

TABLE 18

PROFILE CHANGE EVENT

| | |
|---|---|
| Event ID: | 08.02.2002-09:18:12-001 |
| Subject ID: | Mike Little |
| Event Type: | Profile Change |
| Affected Profile Data: | Job Code = Manager Organization = Distribution Location = M-001 |

Although one embodiment has been illustrated and described in detail, it will be understood that various substitutions and alterations are possible without departing from the spirit and scope of the present invention as defined by the following claims.

What is claimed is:

1. A computer implemented method, comprising the steps of:
   maintaining, by a computer, for each of a plurality of objects an identification of an owner;
   maintaining, by the computer, for each of said objects an identification of at least one corresponding privilege associated therewith;
   defining, by the computer, a role associated with said owner, said role associated with a privilege set containing said privileges enjoyed by said owner, and said role having a criteria that defines which of a plurality of subjects are eligible to enjoy said privilege set, said privileges in said privilege set being associated with corresponding said objects associated with said owner, said owner permitting those subjects to act on selected objects owned by said owner in accordance with said criteria.

2. A computer implemented method according to claim 1, wherein said defining step includes the step of identifying said role as one of a granted role for which each said subject meeting said criteria automatically enjoys said privilege set, and an offered role for which each said subject meeting said criteria enjoys said privilege set only if that subject has managerial approval to enjoy said privilege set.

3. A computer implemented method according to claim 2, wherein said identifying step is carried out by specifying that said role is said offered role; and
including the step of permitting, by the computer, a manager of at least one of said subjects to create a workforce definition which identifies said role and which includes a criteria, said privilege set being automatically enjoyed by each of said subjects who meets said criteria of said role and said criteria of said workforce definition.

4. A computer implemented method according to claim 1, including the step of maintaining, by the computer, an identification of a plurality of different job codes;
including the step of maintaining, by the computer, subject data which identifies each of said subjects and which associates with each said subject a selected one of said job codes; and
wherein said criteria of said role that defines which of said subjects are eligible to enjoy said privilege set is a function of said job codes.

5. A computer implemented method according to claim 1, including the step of maintaining, by the computer, organization data defining an organization, said organizational data identifying a plurality of sections of said organization, and identifying interrelationships between said sections;
including the step of associating, by the computer, each said subject with a respective said organizational section; and
wherein said criteria that defines which of said subjects are eligible to enjoy said privilege set is as a function of said organization data.

6. A computer implemented method according to claim 1, including the step of maintaining, by the computer, location data identifying a plurality of physical locations within an organization and identifying interrelationships between said locations;
including the step of associating, by the computer, each said subject with a respective said location; and
wherein said criteria that defines which of said subjects are eligible to enjoy said privilege set is a function of said location data.

7. A computer implemented method according to claim 1, including the step of automatically evaluating, by the computer, said criteria of said role in relation to said subjects in order to determine which of said subjects are eligible to enjoy each said privilege in said privilege set.

8. A computer implemented method according to claim 7, including the step of executing, by the computer, an application program responsive to operator input for generating an event definition which identifies one of said subjects and which identifies a change relating to said one subject, said computer being responsive to said event definition for automatically updating information representing the subject so as to reflect the change, and for then effecting said automatic evaluation of said criteria.

9. A computer implemented method according to claim 1, wherein one of said objects is a computer-related object; and
including the step of defining, by the computer, one said privilege associated with said computer-related object to involve a right to have access to said computer-related object.

10. A computer implemented method according to claim 1, wherein one of said objects is a physical location; and
including the step of defining, by the computer, one said privilege associated with said physical location to involve a right to have access to said location.

11. A computer readable medium including code which when executed by a computer causes the computer to:
maintain for each of a plurality of objects an identification of an owner;
maintain for each of said objects an identification of at least one corresponding privilege associated therewith;
maintain a definition of a role associated with said owner, said role associated with a privilege set containing said privileges enjoyed by said owner, and said role having a criteria that defines which of a plurality of subjects are eligible to enjoy said privilege set, said privileges in said privilege set being associated with corresponding said objects associated with said owner, said owner permitting those subjects to act on selected objects owned by said owner in accordance with said criteria.

12. The computer readable medium according to claim 11, wherein said definition of said role identifies said role as being one of a granted role for which each said subject meeting said criteria automatically enjoys said privilege set, and an offered role for which each said subject meeting said criteria enjoys said privilege set only if that subject has managerial approval to enjoy said privilege set.

13. The computer readable medium according to claim 12, wherein said definition of said role identifies said role as said offered role; and
wherein the code is executable to permit a manager of at least one of said subjects to create a workforce definition which identifies said role and which includes a criteria, said privilege set being automatically enjoyed by each of said subjects who meets said criteria of said role and said criteria of said workforce definition.

14. The computer readable medium according to claim 11, wherein the code is executable to maintain an identification of a plurality of different job codes, and to maintain subject data which identifies each of said subjects and which associates with each said subject a selected one of said job codes; and
wherein said criteria that defines which of said subjects are eligible to enjoy said privilege set is a function of said job codes.

15. The computer readable medium according to claim 11, wherein the code is executable to maintain organization data defining an organization, said organizational data identifying a plurality of sections of said organization, and identifying interrelationships between said sections;
wherein the code is executable to maintain information associating each said subject with a respective said organizational section; and
wherein said criteria that defines which of said subjects are eligible to enjoy said privilege set is as a function of said organization data.

16. The computer readable medium according to claim 11, wherein the code is executable to maintain location data identifying a plurality of physical locations within an organization and identifying interrelationships between said locations;
wherein the code is executable to maintain information associating each said subject with a respective said location; and
wherein said criteria that defines which of said subjects are eligible to enjoy said privilege set is a function of said location data.

17. The computer readable medium according to claim 11, wherein the code is executable to automatically evaluate said criteria of said role in relation to said subjects in order to determine which of said subjects are eligible to enjoy each said privilege in said privilege set.

18. The computer readable medium according to claim 17, wherein the code is executable to be responsive to operator input for generating an event definition which identifies one of said subjects and which identifies a change relating to said one subject, the code executable to be responsive to said event definition for automatically updating said information representing the subject so as to reflect the change, and for then effecting said automatic evaluation of said criteria.

19. The computer readable medium according to claim 11, wherein one of said objects is a computer-related object; and wherein one said privilege associated with said computer-related object involves a right to have access to said computer-related object.

20. The computer readable medium according to claim 11, wherein one of said objects is a physical location; and wherein one said privilege associated with said physical location involves a right to have access to said location.

21. A computer implemented method according to claim 1, wherein defining the role comprises providing a role profile that identifies said owner and the privileges of said privilege set, wherein the role profile also identifies role appropriators that define the plurality of subjects that are to receive said privileges based on said criteria that includes one or more of job codes, location data, and organization data.

22. A computer implemented method according to claim 21, further comprising:
storing other role profiles for other roles associated with other owners;
receiving an event adding a new employee;
in response to the event, searching the role profiles to determine which role is appropriate for the new employee.

23. The computer readable medium according to claim 11, wherein the role definition comprises a role profile that identifies said owner and the privileges of said privilege set, wherein the role profile also identifies role appropriators that define the plurality of subjects that are to receive said privileges based on said criteria that includes one or more of job codes, location data, and organization data.

24. The computer readable medium according to claim 23, wherein the code is further executable to:
store other role profiles for other roles associated with other owners;
receive an event adding a new employee;
in response to the event, search the role profiles to determine which role is appropriate for the new employee.

* * * * *